(12) United States Patent
Kasuga et al.

(10) Patent No.: US 7,351,675 B2
(45) Date of Patent: Apr. 1, 2008

(54) OPTICAL GLASS, PRECISION PRESS-MOLDING PREFORM, PROCESS FOR PRODUCTION THEREOF, OPTICAL ELEMENT AND PROCESS FOR THE PRODUCTION THEREOF

(75) Inventors: Yoshiko Kasuga, Koganei (JP); Xuelu Zou, Akishima (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/038,495

(22) Filed: Jan. 21, 2005

(65) Prior Publication Data
US 2005/0164864 A1 Jul. 28, 2005

(30) Foreign Application Priority Data
Jan. 23, 2004 (JP) ............................. 2004-015542

(51) Int. Cl.
C03C 3/068 (2006.01)
C03C 3/095 (2006.01)

(52) U.S. Cl. ........................... 501/78; 501/64; 501/903
(58) Field of Classification Search ................ 501/78, 501/79, 903
See application file for complete search history.

(56) References Cited

U.S. PATENT DOCUMENTS

| 4,814,299 A | * | 3/1989 | Ross et al. ..................... 501/78 |
| 5,744,409 A | * | 4/1998 | Hashimoto et al. ........... 501/65 |
| 5,919,718 A | * | 7/1999 | Hirota et al. ................. 501/64 |
| 6,713,419 B1 | * | 3/2004 | Onozawa et al. ............. 501/78 |
| 7,087,543 B2 | * | 8/2006 | Kasuga et al. ................ 501/79 |
| 2006/0079390 A1 | | 4/2006 | Kasuga et al. |
| 2007/0032366 A1 | | 2/2007 | Kasuga et al. |

FOREIGN PATENT DOCUMENTS

| JP | 03037130 A | * | 2/1991 |
| JP | 2003176151 A | * | 6/2003 |
| JP | 2004002178 A | * | 1/2004 |

OTHER PUBLICATIONS

"1991 Data Book of Glass Composition", p. 91, published by Glass Manufacturers' Association of Japan (GMAJ).

* cited by examiner

Primary Examiner—David M Brunsman
(74) Attorney, Agent, or Firm—Nixon & Vanderhye P.C.

(57) ABSTRACT

An optical glass taking account of meltability and the moldability of a preform, having optical constants including a refractive index (nd) of at least 1.57 but less than 1.67 and an Abbe's number (vd) of over 55 but not more than 65, having the property of softening at a low temperature and being suitable as a glass for precision press-molding, the optical glass including an optical glass containing $B_2O_3$, $SiO_2$, $La_2O_3$, $Gd_2O_3$, an alkali metal oxide and an alkaline earth metal oxide as essential components, having a $B_2O_3$ and $SiO_2$ total content of 52% by weight or more and having an $SiO_2/B_2O_3$ content ratio of from 0.38 to 1.2, and an optical glass wherein the relationship of the refractive index (nd) and the Abbe's number (vd) satisfies the equation (1), $$vd > 260 - 126 \times nd. \qquad (1)$$

14 Claims, 1 Drawing Sheet

Fig. 1

OPTICAL GLASS, PRECISION PRESS-MOLDING PREFORM, PROCESS FOR PRODUCTION THEREOF, OPTICAL ELEMENT AND PROCESS FOR THE PRODUCTION THEREOF

TECHNICAL FIELD

The present invention relates to an optical glass which comprises $B_2O_3$, $SiO_2$ and $La_2O_3$, which has optical constants including a refractive index (nd) of at least 1.57 but less than 1.67 and an Abbe's number (vd) of over 55 but not more than 65 and also has the property of softening at a low temperature and which is suitable as a glass material for precision press-molding. It also relates to a precision press-molding preform (preform for precision press-molding), formed of the above optical glass and a process for the production thereof, and further relates to an optical element formed of the above glass and a process for the production thereof.

TECHNICAL BACKGROUND

As an optical glass having a refractive index (nd) of about 1.6 and an Abbe's number (vd) of about 60, so-called SK glasses are hitherto known. For example, "1991 Data Book of Glass Composition" (issued by Japan Glass Product Industrial Society, page 91) describes SK16 glass (nd 1.62, vd 60.3).

Since, however, these glasses have a transition temperature that is as high as 660° C., they are not suitable as a glass for precision press-molding. When it is attempted to decrease the glass transition temperature for overcoming the above drawback, there is caused a problem that the glass is deteriorated in weather resistance. When the glass having poor weather resistance is used to make a precision press-molding preform, the surface of the preform is altered with the passage of time, and the surface of an optical element obtained by precision press-molding of the preform is eventually covered with such an altered layer. Further, the surface of an optical element formed of a glass having poor weather resistance is altered with the passage of time as well, and the optical element is inevitably deteriorated in performances to a great extent.

When attempts are made to improve such a glass in weather resistance, there are caused problems that the meltability of the glass is impaired and that the shapeability of the glass in the shaping of a precision press-molding preform from a molten glass is impaired.

DISCLOSURE OF THE INVENTION

Problems to be Solved by the Invention

Under the circumstances, it is a first object of the present invention to provide an optical glass which can overcome the above problems, which takes account of the meltability of a glass and the shapeability to a preform, which has optical constants including a refractive index (nd) of at least 1.57 but less than 1.67 and an Abbe's number (vd) of over 55 but not more than 65 and also has the property of softening at a low temperature and which is suitable as a glass for precision press-molding.

It is a second object of the present invention to provide a precision press-molding preform, formed of the above optical glass, a process for the production thereof, an optical element and a process for the production thereof.

Means to Solve the Problems

For achieving the above objects, the present inventors have made diligent studies and as a result have found the following.

In a glass having optical constants including a refractive index (nd) of at least 1.57 but less than 1.67 and an Abbe's number (vd) of over 55 but not more than 65, $B_2O_3$, $SiO_2$, $La_2O_3$, $Gd_2O_3$, an alkali metal oxide and an alkaline earth metal oxide are caused to be co-present, the total content of $B_2O_3$ and $SiO_2$ and the ratio of the content of $SiO_2$ to the content of $B_2O_3$ ($SiO_2/B_2O_3$) are brought into predetermined ranges, or, nd and vd satisfy a specific relational equation, whereby there can be obtained a glass suitable as a glass for precision press-molding which has excellent weather resistance and meltability. On the basis of the above finding, the present invention has been completed.

That is, the present invention provides;

(1) an optical glass having a refractive index (nd) of at least 1.57 but less than 1.67 and an Abbe's number (vd) of over 55 but not more than 65, the optical glass containing $B_2O_3$, $SiO_2$, $La_2O_3$, $Gd_2O_3$, an alkali metal oxide and an alkaline earth metal oxide as essential components, having a $B_2O_3$ and $SiO_2$ total content of 52% by weight or more and having an $SiO_2/B_2O_3$ content ratio of from 0.38 to 1.2 (to be referred to as "optical glass I" hereinafter), (2) an optical glass as recited in the above (1), which contains, as glass components and by mol %, 25 to 50% of $B_2O_3$,
15 to 40% of $SiO_2$,
over 0% but not more than 5% of $La_2O_3$,
over 0% but not more than 5% of $Gd_2O_3$,
2 to 20% of $Li_2O$,
0 to 10% of $Na_2O$,
0 to 5% of $K_2O$, and
over 0.0% but not more than 15% of BaO, (3) an optical glass as recited in the above (2), which contains, as glass components and by mol %, 0 to 5% of $Y_2O_3$,
0 to 5% of $Al_2O_3$,
0 to 15% of SrO,
0 to 15% of CaO,
0 to 15% of MgO,
0 to 8% of ZnO, and
0 to 3% of $ZrO_2$, (4) an optical glass having a refractive index (nd) of at least 1.57 but less than 1.67 and an Abbe's number (vd) of over 55 but not more than 65, wherein the relationship of the refractive index (nd) and the Abbe's number (vd) satisfies the equation (1), $$vd > 260 - 126 \times nd \quad (1)$$

(to be referred to as "optical glass II" hereinafter), (5) an optical glass as recited in any one of the above (1) to (4), which is used as a glass material for precision press-molding, (6) a precision press-molding preform, which is formed of the optical glass recited in the above (5), (7) an optical element formed of the optical glass recited in any one of the above (1) to (4), (8) a process for the production of a precision press-molding preform, which comprises separating a molten glass gob having a predetermined weight from a molten glass that flows out of a flow pipe, and shaping the molten glass gob into the preform, wherein the preform is shaped which consists of the optical glass recited in the above (5) and has a weight equivalent to said predetermined weight, (9) a process for the production of an optical element, which comprises softening a precision press-molding preform, formed of an optical glass, under heat and precision press-molding the preform, wherein said preform is the preform recited in the above (6) or the preform produced by the process recited in the above (8), (10) a process for the production of an optical element as recited in the above (9), wherein the preform is introduced into a press mold and said press mold and the preform are heated together to carry out the precision press-molding, and (11) a process for the production of an optical element as recited in the above (9), wherein the press mold and the preform are separately pre-heated, and the pre-heated preform is introduced into said press mold to carry out the precision press-molding.

EFFECT OF THE INVENTION

According to the present invention, there can be provided an optical glass particularly suitable as a glass for precision press-molding, which glass takes account of meltability of a glass and shapeability to a preform so that it has optical constants including a refractive index (nd) of at least 1.57 but less than 1.67 and an Abbe's number (vd) of over 55 but not more than 65 and has the property of softening at a low temperature. According to the present invention, these can be further provided a precision press-molding preform, formed of the above optical glass, a process for the production of the preform, an optical element formed of the above glass, and a process for the production of the optical element.

PREFERRED EMBODIMENTS OF THE INVENTION

[Optical Glass]

The optical glass of the present invention includes two embodiments, the optical glass I and the optical glass II. The optical glass I will be explained first.

The optical glass I of the present invention has a refractive index (nd) of at least 1.57 but less than 1.67 and an Abbe's number (vd) of over 55 but not more than 65, contains $B_2O_3$, $SiO_2$, $La_2O_3$, $Gd_2O_3$, an alkali metal oxide and an alkaline earth metal oxide as essential components, has a $B_2O_3$ and $SiO_2$ total content of 52% by weight or more and has an $SiO_2/B_2O_3$ content ratio (weight ratio) of from 0.38 to 1.2.

$B_2O_3$ and $SiO_2$ are essential components for constituting a glass network structure.

$La_2O_3$ is an essential component for improving the glass in durability and weather resistance and bringing the optical constants into the predetermined ranges. When the content of $La_2O_3$ is 19% by weight or more, it is difficult to obtain the intended refractive index, and the Abbe's number may decrease, so that the content of $La_2O_3$ is adjusted to less than 19% by weight, preferably, to 18% by weight or less.

$Gd_2O_3$ is an essential component for improving the glass in weather resistance and bringing the optical constants into the predetermined ranges. When $La_2O_3$ and $Gd_2O_3$ are co-present in the glass, the glass can be improved in devitrification resistance.

The alkali metal oxide is an essential component for imparting the glass with the property of softening at a low temperature. At least one of $Li_2O$, $Na_2O$ and $K_2O$ can be used as an alkali metal oxide. When a large amount of the alkali metal oxide is incorporated, the liquidus temperature increases, and the weather resistance decreases. For improving the glass in the property of softening at a low temperature while minimizing the increase in the liquidus temperature and the decrease in the weather resistance, therefore, it is preferred to introduce at least $Li_2O$.

The alkaline earth metal oxide is introduced for imparting the glass with the predetermined optical constants. The alkaline earth metal oxide can be selected from MgO, CaO, SrO or BaO, and at least one of these is used.

Further, $Y_2O_3$, $Al_2O_3$, ZnO and $ZrO_2$ may be added as required. As a clarifier, $Sb_2O_3$ and $As_2O_3$ may be added in an amount of 0 to 1% by weight based on the total content of glass components excluding these.

When affecting the environment is taken into consideration, it is preferred not to incorporate $As_2O_3$. Similarly, it is preferred to preclude PbO and $TeO_2$. Further, it is not required to use $GeO_2$ that is an expensive raw material.

In the above glass composition, the total content of $B_2O_3$ and $SiO_2$ is required to be 52% by weight or more since they are components for constituting a glass network structure. When the above total content is less than 52% by weight, the devitrification resistance is degraded, and a glass is devitrified when a shaped glass material is formed from a molten glass. Otherwise, it is required to increase the shaping temperature for preventing the devitrification, so that the viscosity of a glass decreases, and the shapeability is impaired to a great extent. The above total content is preferably in the range of 52 to 66% by weight, more preferably in the range of 53 to 65% by weight.

Further, it is required to take account of the content ratio of $B_2O_3$ and $SiO_2$. When the $SiO_2/B_2O_3$ weight ratio is less than 0.38, the glass is degraded in chemical durability and is also degraded in weather resistance. When the $SiO_2/B_2O_3$ weight ratio exceeds 1.2, the glass is degraded in meltability, and it is difficult to prepare a homogeneous glass. The $SiO_2/B_2O_3$ weight ratio is therefore adjusted to 0.38 to 1.2. The $SiO_2/B_2O_3$ weight ratio is preferably in the range of 0.4 to 1.2, more preferably in the range of 0.5 to 1.1.

The above optical glass more preferably has a glass composition containing, as glass components and by mol %, 25 to 50% of $B_2O_3$,
15 to 40% of $SiO_2$,
over 0% but not more than 5% of $La_2O_3$,
over 0% but not more than 5% of $Gd_2O_3$,
2 to 20% of $Li_2O$,
0 to 10% of $Na_2O$,
0 to 5% of $K_2O$, and
over 0% but not more than 15% of BaO.

A content by % represents and will represent a content by mol % unless otherwise specified.

In addition to the above components, the glass composition may contain, as optional components, 0 to 5% of $Y_2O_3$,
0 to 5% of $Al_2O_3$,
0 to 15% of SrO,
0 to 15% of CaO,
0 to 15% of MgO, 0 to 8% of ZnO, and 0 to 3% of $ZrO_2$.

Reasons why the above compositional ranges are preferred will be explained below.

While $B_2O_3$ is a component for constituting the glass network structure, it is also a component that imparts the glass with the property of low dispersion and the property of softening at a low temperature. When the content of $B_2O_3$ is at least 25%, the glass can be improved in the property of softening at a low temperature while maintaining the predetermined optical constants. Further, when it is 50% or less, the glass can be improved in chemical durability and weather resistance. The content of $B_2O_3$ is more preferably in the range of 25 to 38%.

$SiO_2$ works to improve the glass in chemical durability as well. When the content of $SiO_2$ is at least 15%, the glass can be remarkably improved in chemical durability. When the content of $SiO_2$ is limited to 40% or less, the glass can be well imparted with the property of softening at a low temperature and meltability. The content of $SiO_2$ is preferably in the range of 18 to 38%. However, it is required to satisfy the above limitation imposed on the total content of $SiO_2$ and $B_2O_3$ and the $SiO_2/B_2O_3$ weight ratio.

$La_2O_3$ produces an effect on the improvement of the glass in chemical durability and weather resistance, and it is also a very important component for adjusting the optical constants. When the content of $La_2O_3$ is over 0% but not more than 5%, the above effect can be produced while the predetermined optical constants are maintained. Further, the content of $La_2O_3$ is preferably in the range of 0.1 to 5%, still more preferably in the range of 1 to 4%. However, it is required not to exceed the upper limit of the content by weight % mentioned above.

$Gd_2O_3$ has an effect on the improvement of the glass in weather resistance and on the adjustment of the optical constants. The content of $Gd_2O_3$ is preferably over 0% but not more than 5%, more preferably in the range of 0.1 to 5%. When incorporated together with $La_2O_3$, $Gd_2O_3$ works to improve the glass in weather resistance to a great extent.

$Y_2O_3$ has an effect on the improvement of the glass in weather resistance and on the adjustment of the optical constants. The content of $Y_2O_3$ is preferably 0 to 5%.

More preferably, the total content of $La_2O_3$, $Gd_2O_3$ and $Y_2O_3$ is 1% or more.

$Li_2O$ has an effect on the improvement of the glass in the property of softening at a low temperature. When the content of $Li_2O$ is 2% or more, there can be attained the property of fully softening at a low temperature, and the glass is remarkably improved in precision press-moldability. When an increase in the liquidus temperature and a decrease in weather resistance are taken into account, it is preferred to restrict the upper limit of the content $Li_{2O}$ to 20%. The content of $Li_2O$ is more preferably in the range of 5 to 18%.

$Na_2O$ may be used for adjusting the property of softening at a low temperature and the stability of the glass. From the point of view of maintaining the durability and the optical constants, the content of $Na_2O$ is preferably in the range of 0 to 10%, more preferably in the range of 0 to 8%.

$K_2O$ is also a component that can be used for adjusting the property of softening at a low temperature and the stability of the glass. From the point of view of maintaining the durability and the optical constants, the content of $K_2O$ is preferably in the range of 0 to 5%, more preferably in the range of 0 to 4%.

BaO is a component that is incorporated for adjusting the optical constants. However, when incorporated to excess, BaO degrades the weather resistance of the glass. Therefore, the content of BaO is preferably over 0% but not more than 15%, more preferably in the range of 1 to 15%, still more preferably in the range of 2 to 13%.

CaO has the effect of maintaining the property of softening at a low temperature and the predetermined optical constants when it is co-present with $B_2O_3$ and $SiO_2$ that are components for constituting the glass network structure. From the point of view of maintaining the durability and weather resistance, the content of CaO is preferably 0 to 15, more preferably in the range of 0 to 13%.

When incorporated in place of BaO, SrO is a component that can improve the durability to a great extent while maintaining the optical constants. However, when it is incorporated to excess, the glass is degraded in durability, so that the content of SrO is preferably 0 to 0.15%, more preferably 1 to 12%.

When incorporated in place of $Li_2O$, MgO increases the Abbe's number (vd) and improves the durability. However, when MgO is incorporated to excess, the stability is decreased, so that the content of MgO is preferably 0 to 15%, more preferably 0 to 13%.

For maintaining high durability while the optical constants are maintained in the predetermined ranges, the total content of BaO, SrO, CaO and MgO is preferably 12% or more, more preferably 13% or more. The upper limit of the total content of these is approximately 25%.

ZnO has the effect of improving the property of softening at a low temperature and the weather resistance. When incorporated to excess, however, it is difficult to obtain the predetermined optical constants, so that the content of ZnO is preferably in the range of 0 to 8%, more preferably in the range of 0 to 6%.

$Al_2O_3$ works to improve the durability and the weather resistance. When incorporated to excess, however, the glass is degraded in the property of softening at a low temperature, and it is difficult to obtain the predetermined optical constants, so that the content of $Al_2O_3$ is preferably in the range of 0 to 5%, more preferably in the range of 0 to 4%.

$ZrO_2$ may be incorporated as an optional component in an amount of 0 to 3%.

From the point of view of imparting the glass with the above preferred properties, the total content of $B_2O_3$, $SiO_2$, $La_2O_3$, $Gd_2O_3$, $Li_2O$, $Na_2O$, $K_2O$, BaO, $Y_2O_3$, $Al_2O_3$, SrO, CaO, MgO, ZnO and $ZrO_2$ is preferably over 95%, more preferably over 98%, still more preferably over 99%. Particularly preferably, the optical glass is substantially formed of the above components alone. The above compositional ranges do not include the content of the above clarifier, since the content of the clarifier should be calculated based on the total content of the above glass components excluding the clarifier.

In addition, a small amount of F or $P_2O_5$ may be incorporated so long as the object of the present invention is not impaired. However, it is preferred to preclude these so that the glass is not degraded in properties.

Next, the optical glass II will be explained below. The optical glass II of the present invention has a refractive index (nd) of at least 1.57 but less than 1.67 and an Abbe's number (vd) of over 55 but not more than 65, wherein the relationship of the refractive index (nd) and the Abbe's number (vd) satisfies the equation (1).

$$vd > 260 - 126 \times nd \qquad (1)$$

In the range of the optical constants represented by a refractive index (nd) of at least 1.57 but less than 1.67 and an Abbe's number (vd) of over 55 but not more than 65, it has been difficult to satisfy the weather resistance, the durability, the devitrification resistance, the property of softening at a low temperature and the solubility at the same time. In the range that is specified by the above equation (1), the optical glass II of the present invention can satisfy the above various properties by, selecting the glass composition as described above.

In a $B_2O_3$—$SiO_2$-containing glass, $TiO_2$ is sometimes introduced for increasing the refractive index of the glass, or $ZrO_2$ is sometimes incorporated for adjusting the Abbe's number. However, when $TiO_2$ alone or $ZrO_2$ alone is incorporated, the refractive index can be increased, but the dispersion increases, or it is difficult to increase the refractive index while maintaining the Abbe's number. In the present invention, however, $La_2O_3$ and $Gd_2O_3$ are incorporated, whereby an optical glass for precision press-molding excellent in the region of the above optical constants can be materialized. In the optical glass of the present invention, preferably, the refractive index (nd) is at least 1.57 but not more than 1.66, and the Abbe's number (vd) is at least 56 but not more than 65, for further improving the glass in various properties.

The glass properties other than the optical constants will be explained below.

(Property of Softening at Low Temperature)

For obtaining excellent precision press-moldability, the optical glass of the present invention can have a low glass transition temperature (Tg), and the glass transition temperature is preferably 590° C. or lower, more preferably 580° C. or lower, still more preferably 560° C. or lower.

The temperature of the glass and the temperature of a press mold during precision press-molding can be set at relatively low temperature(s), so that the lifetime of the press mold can be increased. The optical glass of the present invention is therefore suitable as a glass for precision press-molding.

(Weather Resistance)

The weather resistance can be quantitatively evaluated on the basis of haze. The haze can be measured according to "Method of measuring optical glass for chemical durability (surface method)" of Japan Optical Glass Industry Society Standard JOGIS07-1975. In this case, a measurement sample having a size of 20 mm×20 mm and a thickness of 2 mm is used, and the measurement sample is optically polished on the surface that is to be exposed to a measurement light, and then maintained in a constant-temperature constant-humidity chamber having a temperature of 60° C. and a relative humidity of 90% for 350 hours before the measurement. Having excellent durability and excellent weather resistance, the optical glass of the present invention shows very small haze, and the haze is preferably 6% or less, more preferably 5% or less.

(Water Resistance)

The optical glass of the present invention also exhibits excellent water resistance. The water resistance can be measured according to "Method of measuring optical glass for chemical durability (powder method)" of Japan Optical Glass Industry Society Standard JOGIS06-1975.

According to the above standard, Dw that shows a loss of mass of a glass by percentage represents the water resistance. The water resistance of the optical glass of the present invention, represented by Dw, is 0.24% or less, preferably 0.20% or less.

(Coloring)

The optical glass of the present invention is colorless and transparent so long as a colorant such as Cu, Fe, V or Cr is not introduced, and it is suitable as a material for optical elements that transmit light, such as a lens and a prism.

[Precision Press-Molding Preform and Method for the Production Thereof]

The precision press-molding preform, provided by the present invention, will be explained below.

The precision press-molding preform, provided by the present invention, is formed of the above optical glass. The precision press-molding preform is a shaped material made of the optical glass having a weight equivalent to the weight of a press-molded product. The preform is shaped in a proper form depending upon the form of a press-molded article, and the form thereof includes, for example, a sphere, an ellipsoid of revolution, and the like. The preform is heated so as to have a viscosity at which it is press-moldable, before its press-molding.

The form of the preform including the above ellipsoid of revolution is preferably a form having one axis of revolution symmetry. The above form having one axis of revolution symmetry includes a form having a corner-free or dent-free smooth outline in a cross section including the above axis of revolution symmetry, such as a form having an elliptic outline whose minor axis corresponds to the axis of revolution symmetry in the above cross section. When the minor axis corresponds to the axis of revolution symmetry, the form is preferably as follows. When one of angles formed by a line connecting any point on the outline of the preform in the above cross section to the center of the gravity of the preform on the axis of revolution symmetry and a tangent line contacting the outline on the above point on the outline is taken as θ, and when the above point starts at the axis of revolution symmetry and moves along the outline, the angle θ monotonously increases from 90°, then decreases monotonously and then decreases monotonously to come to be 90° at the other point where the outline crosses the axis of revolution symmetry.

The above preform may have a thin film such as a mold release film on its surface as required. Examples of the mold release film include a carbon-containing film and a self-assembled film. The above preform can be press-molded to give an optical element having the predetermined optical constants.

Further, the precision press-molding preform, provided by the present invention, is obtained by shaping a glass gob having the above composition from a glass in a molten state and solidifying the gob, without mechanically processing it after the solidification. That is, the precision press-molding preform, provided by the present invention, can be produced, for example, by method in which a molten glass gob having a predetermined weight is separated from an out-flowing molten glass, and cooled to solidness to shape the preform formed of the above optical glass having the predetermined weight.

The above method has advantages that mechanical processing such as cutting, grinding and polishing are not required. Concerning a mechanically processed preform, it is required to carry out annealing before the mechanical processing so that strains of the glass are decreased to such an extent that the preform is not broken by the mechanical processing. According to the above method for producing a preform, however, the annealing for preventing breaking is obviated. Further, a preform having a smooth surface can be shaped. Further, the entire surface is a surface formed by the solidification of a glass in a molten state, so that fine scratches or damage caused by polishing do not exist. In addition to the excellent chemical durability and weather resistance of the optical glass per se, the surface of the preform is smooth and therefore, the surface area of the preform is small as compared with any preform having surface scratches or damage. When the preform is placed in atmosphere, therefore, the surface thereof is not easily altered, and the preform can also maintain a clean surface state obtained just after shaped.

In the above method for producing a preform, preferably, the preform is shaped in a floating state in which a gas pressure is applied to the preform, from the point of view of forming a smooth and clean surface. Further, the preform is preferably a preform the entire surface of which is formed by solidification of a glass in a molten state or a preform whose surface is formed of a free surface, that is, a preform of which the entire surface is a free surface. Further, the preform is preferably free of any cutting mark called a shear mark. The shear mark occurs when an outflowing molten glass is cut with a cutting blade. When the shear mark remains at a stage where a precision press-molded product is formed, such a portion constitutes a defect. Therefore, the preform is preferably free of any shear mark at the stage when the preform is shaped. The method for separating a molten glass using no cutting blade so that no shear mark is formed is formed includes a method in which a molten glass is dropped from a flow pipe, or a method in which the forward end portion of a molten glass flow from a flow pipe is supported and the support is removed at a time when a molten glass gob having a predetermined weight can be separated (to be referred to as "descent-separation method"). In the descent-separation method, the molten glass gob is separated at a narrow portion formed between the forward end portion and the flow pipe side portion of the molten glass flow, and the molten glass gob having a predetermined weight can be obtained. Then, while the thus-obtained molten glass gob in a softened state, the molten glass gob is shaped into a form suitable for press-molding, whereby the preform can be obtained.

In the above method for producing a preform, a molten glass gob for one preform is separated, and the glass gob is shaped into a preform in a high-temperature state where it has a temperature of a softening point or higher. However, the above molten glass gob may be cast into a mold to shape a glass shaped material formed of the above optical glass, and the glass shaped material may be mechanical processed to form a preform having a predetermined weight. Before the mechanical processing, preferably, the glass is annealed to fully remove strains so that the glass is not broken.

[Optical Element and Process for the Production Thereof]

The optical element of the present invention is formed of the above optical glass, and can be produced by heating the above preform and precision press-molding it.

According to the present invention, the glass constituting the optical element is the optical glass of the present invention, so that the optical element has the properties (refractive index (nd) and Abbe's number (vd)) of the above optical glass and accordingly has the predetermined optical constants. Further, the optical element is formed of the glass having excellent weather resistance, and the optical-function surface thereof is not mechanical processed and therefore has no fine scratches or latent damage, so that the alteration of the glass in the optical-function surface is effectively prevented like the preform shaped directly from a molten glass.

Examples of the optical element of the present invention include various lenses such as a spherical lens, an aspherical lens, a microlens, etc., a diffraction grating, a lens with a diffraction grating, a lens array, a prism, and the like.

The above optical element may be optionally provided with an optical thin film such as an anti-reflection film, a total reflection film, a partial reflection film or a film having spectral characteristics.

The process for the production of an optical element will be explained below.

The process for the production of an optical element, provided by the present invention, comprises heating a press-molding preform, formed of the above optical glass, or a press-molding preform, produced by the above production process, and precision press-molding the same.

The precision press-molding is also called "mold optics process" and is well known in the technical field of the art to which the present invention belongs.

The surface of the optical element that transmits, reflects, diffracts or reflects light will be referred to as "optical-function surface". For example, the lens surface such as the spherical surface of a spherical lens or the aspherical surface of an aspherical lens corresponds to the optical-function surface. The process of the precision press-molding refers to a process for transferring the form of the molding surface of a press mold precisely to a glass to form the optical-function surface by press-molding. That is, the optical-function surface can be finished without the necessity of applying a mechanical processing such as grinding, polishing, or the like.

The process of the present invention is therefore suitable for producing optical elements such as a lens, a lens array, a diffraction grating, a prism, etc., and is best suitable for highly productively producing aspherical lenses.

According to the process for the production of an optical element, provided by the present invention, an optical element having the above optical properties can be produced, and further, the glass constituting the preform has a low transition temperature (Tg) and can be press-molded at a relatively low temperature, so that a load on the molding surface of a press mold is decreased and that the lifetime of the mold can be prolonged. Further, the glass constituting the preform has high stability, so that the devitrification can be effectively prevented in reheating and pressing steps. Further, a series of steps from the step of melting the glass to the step of obtaining the end product can be highly productively carried out.

As a press mold for the precision press-molding, there can be used a press mold that is formed from a mold material such as a silicon carbide, an ultra-hard material or stainless steel and that has a molding surface provided with a mold release film, while a press mold formed from silicon carbide is preferred. The mold release film can be selected from a carbon-containing film, a noble metal alloy film, or the like, while a carbon-containing film is preferred in view of durability and a cost.

In the precision press-molding process, desirably, a non-oxidizing gas atmosphere is employed as an atmosphere during the molding for maintaining the molding surface of the press mold under excellent conditions. Nitrogen or a mixed gas of nitrogen and hydrogen is preferable as the non-oxidizing gas.

As the process for producing an optical element, provided by the present invention, particularly, a suitable precision press-molding process, will be explained below.

(Precision Press-Molding Process 1)

In this process, a press-molding preform is introduced into a press mold, and the press mold and the preform are heated together to carry out precision press-molding of the preform (to be referred to as "precision press-molding process 1" hereinafter).

In the precision press-molding process 1, preferably, the press mold and the above preform are heated together to a temperature at which the glass constituting the preform exhibits a viscosity of $10^6$ to $10^{12}$ dPa·s, to carry out the precision press-molding.

Further, the above precision press-molded product is taken out of the press mold desirably after it is cooled to a temperature at which the above glass exhibits a viscosity of $10^{12}$ dPa·s or more, more preferably $10^{14}$ dPa·s or more, still more preferably $10^{16}$ dPa·s or more.

Under the above conditions, the form of the molding surface of the press mold can be more precisely transferred to the glass, and the precision press-molded product can be taken out without causing any deformation.

(Precision Press-Molding Process 2)

In this process, the press mold and the preform are separately pre-heated, and the pre-heated preform is introduced into the press mold to carry out the precision press-molding thereof (to be referred to as "precision press-molding process 2" hereinafter).

According to this process, the above preform is pre-heated before introduced into the press mold, so that an optical element having excellent surface accuracy free of a surface defect can be produced while the cycle time can be decreased.

Preferably, the temperature for preheating the press mold is set at a temperature lower than the temperature for preheating the preform. The temperature for preheating the press mold is set a lower temperature as described above, so that the wearing of the press mold can be decreased.

In the precision press-molding process 2, preferably, the preform is preheated to a temperature at which the glass constituting the preform exhibits a viscosity of $10^9$ dPa·s or less, more preferably to a temperature at which the glass exhibits a viscosity of less than $10^9$ dPa·s.

Further, desirably, the preheating is carried out while the above preform is caused to float, and more desirably, the preform is preferably preheated to a temperature at which the glass constituting the preform exhibits a viscosity of $10^{5.5}$ to $10^9$ dPa·s, more preferably at least $10^{5.5}$ but less than $10^9$ dPa·s.

Further, preferably, cooling of the glass is started simultaneously with, or during, the pressing of the preform.

The temperature of the press mold is adjusted to a temperature lower than the above temperature for preheating the preform, and it can be set at an approximate temperature at which the above glass exhibits a viscosity of $10^9$ to $10^{12}$ dPa·s.

In this process, preferably, the precision press-molded product is taken out of the mold after it is cooled to a temperature at which the above glass has a viscosity of $10^{12}$ dPa·s or more.

An optical element obtained by the precision press-molding is taken out of the press mold, and it is gradually cooled as required. When the press-molded product is an optical element such as a lens or the like, it may be surface-coated with an optical thin film.

Since the optical glass of the present invention is excellent in chemical durability as described above, an alteration layer is not easily formed on the surface thereof by polishing. The glass of the present invention therefore permits the making of a preform by grinding and polishing, and an optical element such as a lens or the like can be produced from this preform by precision press-molding. Further, an optical element such as a spherical lens, an aspherical lens, or the like can be produced by grinding and polishing the glass without employing the precision press-molding.

EXAMPLES

The present invention will be explained further in detail with reference to Examples hereinafter, while the present invention shall not be limited by these Examples.

Examples 1-7

Table 1 shows the composition of each of glasses in Examples 1 to 7, and Table 2 shows the refractive index (nd), Abbe's number (vd), transition temperature (Tg), sag temperature (Ts), Dw, haze and specific gravity of each glass. Oxides, hydroxides, carbonates and nitrates such as $SiO_2$, $Al_2O_3$, $Al(OH)_3$, $CaCO_3$, $ZnO$, $La_2O_3$, $Gd_2O_3$, $Y_2O_3$, $ZrO_2$, $Li_2CO_3$, etc., were used as corresponding raw materials of each glass, these raw materials were weighed so that the composition shown in Table 1 was obtained after the formation of the glass, and these raw materials were fully mixed. Then, the mixture was poured into a platinum crucible and melted with stirring in an electric furnace in a temperature range of 1,200 to 1,250° C. in atmosphere for 2 to 4 hours. A homogenized and clarified glass melt was cast into a 40×70×15 mm mold made of carbon, and a cast glass was gradually cooled to a transition temperature. Immediately thereafter it was placed in an annealing furnace, and annealed at a temperature around the transition temperature for 1 hour, and in the annealing furnace, it was gradually cooled to room temperature. In this manner, optical glasses in Examples 1 to 7 were obtained. The thus-obtained glasses were magnified and observed through a microscope, to show none of precipitation of a crystal and a residual non-melted material.

Each of the obtained optical glasses was measured for a refractive index (nd), an Abbe's number (vd), a transition temperature (Tg), a sag temperature (Ts), Dw, haze and specific gravity as follows.

(1) Refractive Index (nd) and Abbe's number (vd)

An optical glass obtained by gradually cooling at a rate of −30° C./hour was measured.

(2) Glass Transition Temperature (Tg) and Sag Temperature (Ts)

A glass was measured at a temperature elevation rate of 4° C./minute with an apparatus for thermomechanical analysis supplied by Rigaku Corporation.

(3) Water Resistance

Measured according to "Method of measuring optical glass for chemical durability (powder method)" of Japan Optical Glass Industry Society Standard JOGIS06-1975. Dw as an index for water resistance refers to a loss of mass of a glass represented by percentage.

(4) Haze

A test sample having a size of 20×20×2 mm and a standard sample (dense barium crown glass: BACD5N) having a form equivalent to the form of the test sample were polished to such an extent that no graining was visually found, and these samples were washed.

Then, the test sample and the standard sample were maintained in an environmental tester having a temperature of 65° C. and a relative humidity of 0% for a predetermined time period, and then maintained at 65° C. at a relative humidity of 95% for 350 hours.

The test sample and the standard sample were installed in a haze meter having an integrating sphere and these samples were measured for haze with the haze meter.

(5) Specific Gravity

Measured by an Archimedes method. Any glass had a specific gravity of less than 3.5.

From the results shown in Table 2, it is clear that any glass exhibited the property of well softening at a low temperature and exhibited excellent meltability and weather resistance, and they were suitable as an optical glass for precision press-molding.

Each of clarified and homogenized molten glasses corresponding to the above glasses was caused to independently flow, at a constant flow rate, out of a pipe made of a platinum alloy that was temperature-adjusted to a temperature region in which stable flowing was permitted. A molten glass gob having an end preform weight was separated by a dropping or a descent-separation method, received with a receiver mold member having a bottom provided with a gas ejection port, and shaped into a press-molding preform while the glass gob was caused to float by ejecting a gas from the gas ejection port. The time intervals for separating the molten glass were set, whereby spherical preforms having a diameter of 2 to 30 mm were obtained. The weights of the preforms were precisely in agreement with the values of the set intervals, and all of the preforms had smooth surfaces.

Figure 1:
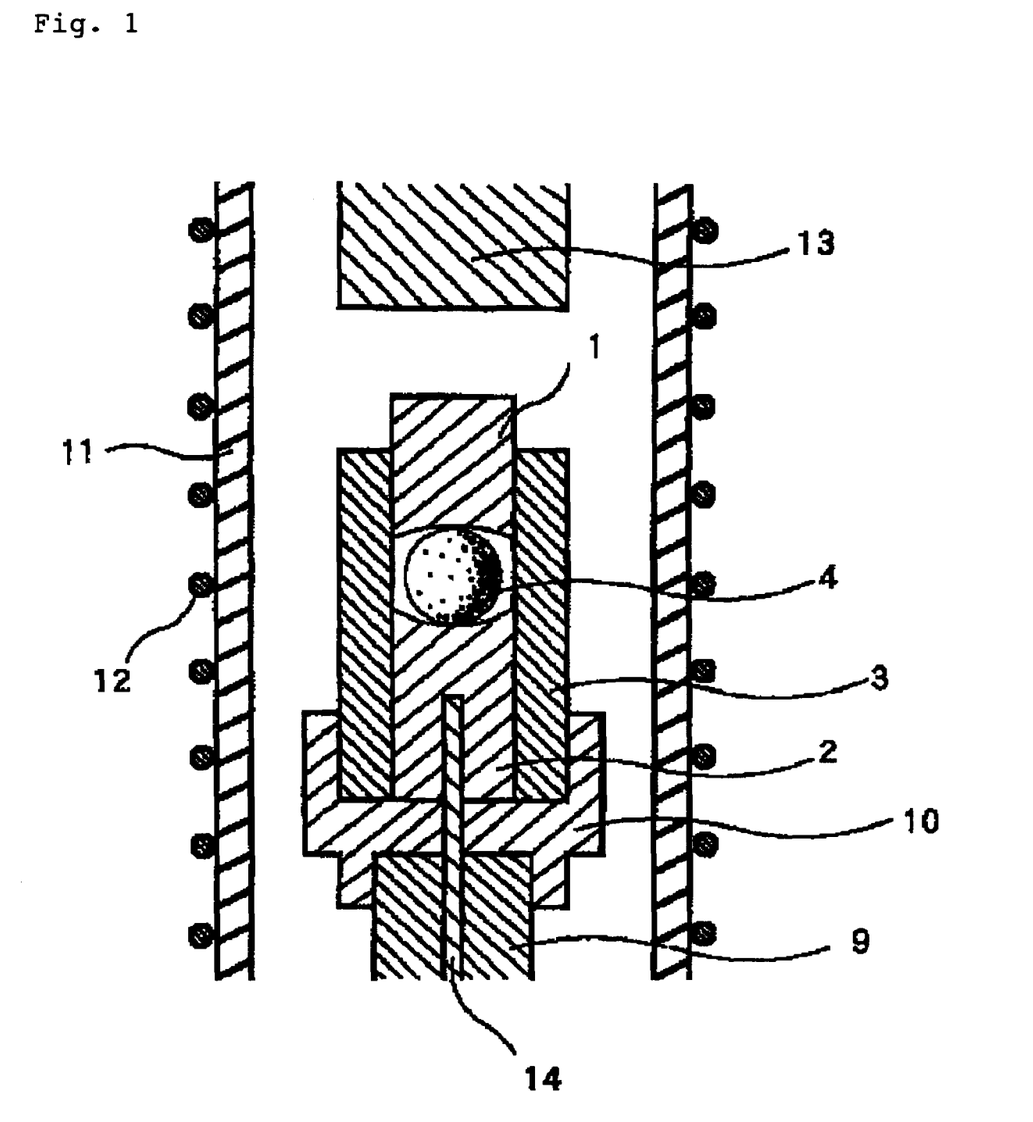
FIG. 1 is a schematic cross-sectional view of one example of an apparatus for precision press-molding used in Examples.

Each of the thus-obtained preforms was precision press-molded with a pressing apparatus shown in FIG. 1, to give aspherical lenses. Specifically, the preform was placed between a lower mold member 2 and an upper mold member 1 constituting the pressing apparatus, then, the atmosphere in a quartz tube 11 was replaced with a nitrogen atmosphere, and a heater 12 was electrically powered to internally heat the quartz tube 11. The temperature inside the press mold was set at a temperature at which the glass to be molded exhibited a viscosity of $10^8$ to $10^{10}$ dPa·s, and while the above temperature was maintained, a pressing rod 13 was moved downward to press the upper mold member 1, so that the preform 4 set in the press mold was pressed. The pressing was carried out at a pressure of 8 MPa for 30 seconds. After the pressing, the pressure was released, and in a state where a glass molded product obtained by the press-molding was in contact with the lower mold member 2 and the upper mold member 1, the glass molded product was gradually cooled to a temperature at which the above glass exhibited a viscosity of at least $10^{12}$ dPa·s. Then, it was rapidly cooled to room temperature and taken out of the press mold, to give an aspherical lens. Aspherical lenses obtained in the above manner had remarkably high surface accuracy. In addition, in FIG. 1, numeral 3 indicates a sleeve (sleeve mold member), numeral 9 indicates a support rod, numeral 10 indicates a support base, and numeral 14 indicates a thermocouple.

Each of the aspherical lenses obtained by the precision press-molding may be provided with an anti-reflection film as required.

The same preforms as those described above were precision press-molded by another method as follows. In this method, the preform was pre-heated to a temperature at which the glass constituting the preform had a viscosity of $10^8$ dPa·s, while it was caused to float. On the other hand, a press mold having an upper mold member, a lower mold member and a sleeve was pre-heated to a temperature at which the above glass exhibited a viscosity of $10^9$ to $10^{12}$ dPa·s, and the pre-heated preform was introduced into the cavity of the press mold to carry out precision press-molding. The pressure for the precision press-molding was set at 10 MPa. Simultaneously with the start of the pressing, the cooling of the press mold was started, and the cooling was continued until the glass being molded exhibited a viscosity of at least $10^{12}$ dPa·s. Then, a molded product was taken out of the press mold to give an aspherical lens. Aspherical lenses obtained in the above manner had remarkably high surface accuracy.

Each of the aspherical lenses obtained by the precision press-molding may be provided with an anti-reflection film as required.

In the above manner, highly accurate optical elements made of glasses having excellent weather resistance and high internal qualities were highly productively obtained.

Comparative Examples 1-3

Tables 1 and 2 show compositions and properties of glasses of Comparative Examples 1 to 3. The $SiO_2/B_2O_3$ weight ratio of the glass of Comparative Example 1 was too large, and it was impossible to melt the same at 1,200° C. Containing no $Gd_2O_3$, the glasses of Comparative Example 2 had a large Dw value representing water resistance and large haze, and it was also poor in durability. The glass of Comparative Example 3 had too small an $SiO_2/B_2O_3$ weight ratio, and it had a large Dw value representing water resistance and large haze and was also poor in durability.

TABLE 1

| | | | | | | Glass composition | | | | | | | | | | |
|---|---|---|---|---|---|---|---|---|---|---|---|---|---|---|---|---|
| | | $B_2O_3$ | $SiO_2$ | $SiO_2 + B_2O_3$ | $(SiO_2/B_2O_3)$ | $La_2O_3$ | $Gd_2O_3$ | $Y_2O_3$ | $Al_2O_3$ | CaO | BaO | ZnO | SrO | $Li_2O$ | $Na_2O$ | MgO | Total |
| Example 1 | mol % | 35.5 | 30.0 | | | 2.0 | 2.0 | | 2.0 | 6.0 | 8.0 | | | 12.5 | | 2.0 | 100.0 |
| | wt. % | 31.4 | 22.9 | 54.3 | (0.73) | 8.3 | 9.2 | | 2.6 | 4.3 | 15.6 | | | 4.7 | | 1.0 | 100.0 |
| Example 2 | mol % | 33.5 | 32.0 | | | 2.0 | 2.0 | | 1.0 | 4.0 | 4.0 | | 6.0 | 11.5 | | 4.0 | 100.0 |
| | wt. % | 30.3 | 25.0 | 55.3 | (0.82) | 8.5 | 9.4 | | 1.3 | 2.9 | 8.0 | | 8.1 | 4.5 | | 2.1 | 100.0 |
| Example 3 | mol % | 30.5 | 35.5 | | | 2.0 | 2.0 | | 0.5 | 4.0 | 4.0 | | 6.0 | 11.0 | | 4.5 | 100.0 |
| | wt. % | 27.7 | 27.9 | 55.6 | (1.00) | 8.5 | 9.5 | | 0.7 | 2.9 | 8.0 | | 8.1 | 4.3 | | 2.4 | 100.0 |
| Example 4 | mol % | 30.5 | 35.5 | | | 2.0 | 2.0 | | 0.5 | 3.0 | 3.0 | | 8.0 | 10.5 | | 5.0 | 100.0 |
| | wt. % | 27.7 | 27.9 | 55.6 | (1.00) | 8.5 | 9.5 | | 0.7 | 2.2 | 6.0 | | 10.8 | 4.1 | | 2.6 | 100.0 |
| Example 5 | mol % | 35.5 | 30.5 | | | 2.0 | 2.0 | | 0.5 | 4.0 | 4.0 | | 6.0 | 10.5 | | 5.0 | 100.0 |
| | wt. % | 32.1 | 23.8 | 55.9 | (0.74) | 8.5 | 9.4 | | 0.7 | 2.9 | 8.0 | | 8.1 | 4.1 | | 2.6 | 100.0 |
| Example 6 | mol % | 35.0 | 31.0 | | | 2.0 | 2.0 | | 0.5 | 4.0 | 4.0 | | 6.0 | 10.5 | | 5.0 | 100.0 |
| | wt. % | 31.6 | 24.2 | 55.8 | (0.76) | 8.5 | 9.4 | | 0.7 | 2.9 | 8.0 | | 8.1 | 4.1 | | 2.6 | 100.0 |
| Example 7 | mol % | 42.4 | 22.4 | | | 1.2 | 0.8 | 2.0 | | 7.0 | | 5.0 | | 19.2 | | | 100.0 |
| | wt. % | 43.4 | 19.7 | 63.1 | (0.45) | 5.8 | 4.3 | 6.6 | | 5.8 | | 6.0 | | 8.4 | | | 100.0 |
| CEx. 1 | mol % | 26.7 | 39.0 | | | 3.5 | | | 0.9 | 9.2 | 3.8 | 3.7 | | 7.6 | 1.7 | 4.4 | 100.3 |
| | wt. % | 25.4 | 32.0 | 57.4 | (1.26) | 15.5 | | | 1.2 | 7.1 | 7.9 | 4.1 | | 3.1 | 1.4 | 2.4 | 100.0 |

TABLE 1-continued

| | | | | | Glass composition | | | | | | | | | | | |
|---|---|---|---|---|---|---|---|---|---|---|---|---|---|---|---|---|
| | | $B_2O_3$ | $SiO_2$ | $SiO_2 + B_2O_3$ | $(SiO_2/B_2O_3)$ | $La_2O_3$ | $Gd_2O_3$ | $Y_2O_3$ | $Al_2O_3$ | CaO | BaO | ZnO | SrO | $Li_2O$ | $Na_2O$ | MgO | Total |
| CEx. 2 | mol % | 32.5 | 35.0 | | | 4.0 | | | | | 12.0 | | | 16.5 | | | 100.0 |
| | wt. % | 28.3 | 26.3 | 54.6 | (0.93) | 16.3 | | | | | 23.0 | | | 6.2 | | | 100.0 |
| CEx. 3 | mol % | 48.6 | 20.2 | | | 3.9 | | | | 6.0 | | | 6.0 | 15.3 | | | 100.0 |
| | wt. % | 47.5 | 17.0 | 64.5 | (0.36) | 17.6 | | | | 4.7 | | | 6.8 | 6.4 | | | 100.0 |

CEx. = Comparative Example
$(SiO_2/B_2O_3)$ stands for a weight ratio.

TABLE 2

Physical properties of optical glass

| | nd | vd | Tg (° C.) | Ts (° C.) | Dw (° C.) | Haze (%) | Specific gravity |
|---|---|---|---|---|---|---|---|
| Example 1 | 1.62059 | 60.19 | 542.5 | 586.6 | 0.13 | 5.6 | 3.185 |
| Example 2 | 1.62053 | 60.36 | 539.5 | 589.9 | 0.11 | 4.6 | 3.195 |
| Example 3 | 1.62104 | 60.41 | 554.4 | 600.8 | 0.10 | 4.6 | 3.208 |
| Example 4 | 1.62079 | 60.27 | 550.2 | 597.1 | 0.11 | 4.4 | 3.227 |
| Example 5 | 1.62097 | 60.52 | 546.0 | 592.5 | 0.13 | 3.9 | 3.181 |
| Example 6 | 1.62085 | 60.45 | 456.8 | 591.6 | 0.12 | 4.4 | 3.194 |
| Example 7 | 1.61597 | 59.11 | 505.1 | 541.6 | 0.22 | 9.5 | 3.754 |
| CEx. 1 | 1.61597 | 59.11 | 529.8 | 570.4 | 0.06 | 3.2 | 3.08 |
| CEx. 2 | 1.62837 | 59.84 | 529.8 | 570.4 | 0.36 | 27.6 | 3.285 |
| CEx. 3 | 1.61100 | 60.61 | 514.6 | 553.9 | 0.39 | 19.3 | 2.889 |

CEx. = Comparative Example

INDUSTRIAL UTILITY

The optical glass of the present invention has optical constants including a refractive index (nd) of at least 1.57 but less than 1.67 and an Abbe's number (vd) of over 55 but not more than 65, can simultaneously satisfy requirements of weather resistance, durability, devitrification resistance, the property of softening at a low temperature and meltability and is suitable for precision press-molding, and it can be used for producing various optical elements.

The invention claimed is:

1. An optical glass having a refractive index (nd) of at least 1.57 but less than 1.67 and an Abbe's number (vd) of over 55 but not more than 65,
the optical glass containing by mol %,
25 to 50% of $B_2O_3$,
15 to 40% of $SiO_2$,
over 0% but not more than 5% of $La_2O_3$,
over 0% but not more than 5% of $Gd_2O_3$,
2 to 20% of $Li_2O$,
0 to 10% of $Na_2O$,
0 to 5% of $K_2O$,
over 0% but not more than 15% of BaO, and an alkaline earth metal oxide as essential components, and 1 to 12% by mol of SrO,
having a $B_2O_3$ and $SiO_2$ total content of 52% by weight or more, having an $SiO_2/B_2O_3$ content ratio of from 0.38 to 1.1 and a total content MgO, CaO, BaO and SrO as alkaline earth metal oxides is 12 to 25 mol %.

2. The optical glass of claim 1, which contains, as glass components and by mol %,
0 to 5% of $Y_2O_3$,
0 to 5% of $Al_2O_3$,
0 to 12% of SrO,
0 to 15% of CaO,
0 to 15% of MgO,
0 to 8% of ZnO, and
0 to 3% of $ZrO_2$.

3. An optical glass having a refractive index (nd) of at least 1.57 but less than 1.67 and an Abbe's number (vd) of over 55 but not more than 65,
the optical glass containing $SiO_2$, $La_2O_3$, $Gd_2O_3$, an alkali metal oxide and an alkaline earth metal oxide as essential components, and 25 to 38 mol % $B_2O_3$, 1 to 12% by mol of SrO, having a $B_2O_3$ and $SiO_2$ total content of 52% by weight or more, having an $SiO_2/B_2O_3$ content ratio of from 0.38 to 1.1 and a total content MgO, CaO, BaO and SrO as alkaline earth metal oxides is 12 to 25 mol %.

4. An optical glass having a refractive index (nd) of at least 1.57 but less than 1.67, an Abbe's number (vd) of over 55 but not more than 65 and a glass transition temperature Tg of 590° C. or lower,
the optical glass containing $B_2O_3$, $SiO_2$, $La_2O_3$, $Gd_2O_3$, an alkali metal oxide and an alkaline earth metal oxide as essential components, and 1 to 12% by mol of SrO, having a $B_2O_3$ and $SiO_2$ total content of 52% by weight or more, having an $SiO_2/B_2O_3$ content ratio of from 0.38 to 1.1 and a total content MgO, CaO, BaO and SrO as alkaline earth metal oxides is 12 to 25 mol %.

5. An optical glass according to claim 1, 3 or 4, wherein the relationship of the refractive index (nd) and the Abbe's number (vd) satisfies the equation (1), $$vd > 260 - 126 \times nd \quad (1).$$

6. The optical glass of claim 1, 3 or 4, which is used as a glass material for precision press-molding.

7. A precision press-molding preform, which is formed of the optical glass recited claim 6.

8. An optical element formed of the optical glass recited in claim 1, 3 or 4.

9. A process for the production of a precision press-molding preform from the optical glass of claim 1, 3 or 4, which comprises separating a molten glass gob having a weight from a molten glass that flows out of a flow pipe, and shaping the molten glass gob into the preform,
wherein the preform is shaped which consists of the optical glass which has a weight equivalent to said weight.

10. A process for the production of an optical element from the optical glass of claim 1, 3 or 4, which comprises softening a precision press-molding preform, formed of an optical glass, under heat and precision press-molding the preform.

11. The process for the production of an optical element as recited in claim 10, wherein the preform is introduced into a press mold and said press mold and the preform are heated together to carry out the precision press-molding.

12. The process for the production of an optical element as recited in claim 10, wherein the press mold and the preform are separately pre-heated, and the pre-heated preform is introduced into said press mold to carry out the precision press-molding.

13. The optical glass of claim 1, 3 or 4, wherein the glass transition temperature Tg is 580° C. or lower.

14. The optical glass of claim 1, 3 or 4, wherein the glass transition temperature Tg is 560° C. or lower.

* * * * *